United States Patent [19]

Sabet

[11] 4,311,131
[45] Jan. 19, 1982

[54] EVACUATED HEATPIPE SOLAR COLLECTOR

[76] Inventor: Faramarz M. Sabet, Via San Sebastiano, 33-Bergamo, Italy

[21] Appl. No.: 969,572

[22] Filed: Dec. 14, 1978

[30] Foreign Application Priority Data

Dec. 19, 1977 [CH] Switzerland ............ 15742/77

[51] Int. Cl.³ .................................. F24J 3/02
[52] U.S. Cl. ............................ 126/433; 126/443; 126/446; 165/104.21
[58] Field of Search ............... 126/433, 443, 446; 165/105

[56] References Cited

U.S. PATENT DOCUMENTS

| | | | |
|---|---|---|---|
| 2,083,611 | 6/1937 | Marshall | 165/105 |
| 3,390,672 | 7/1968 | Snelling | 126/433 |
| 4,027,728 | 6/1977 | Kobayashi et al. | 165/105 |
| 4,038,966 | 8/1977 | Harrison | 165/105 |
| 4,059,093 | 11/1977 | Knowles | 126/433 |
| 4,119,085 | 10/1978 | Knowles et al. | 126/433 |
| 4,134,388 | 1/1979 | Kersten et al. | 126/443 |
| 4,159,706 | 7/1979 | Mahdjuri | 126/443 |
| 4,180,127 | 12/1979 | Maxson | 165/105 |
| 4,183,351 | 1/1980 | Hinotoni | 165/178 |
| 4,186,723 | 2/1980 | Coppola et al. | 126/443 |

*Primary Examiner*—Stephen P. Garbe
*Attorney, Agent, or Firm*—Charles E. Brown

[57] ABSTRACT

An improved solar collector for the exploitation of the thermal energy of sunlight is disclosed, in which the absorber has a transparent pipe containing an absorbing plate connected with a channel containing a transfer-fluid having a critical temperature of the same order of magnitude of the highest working temperature of the whole system so as to dispense with difficulties under no-load conditions or with a surplus of solar irradiation.

4 Claims, 14 Drawing Figures

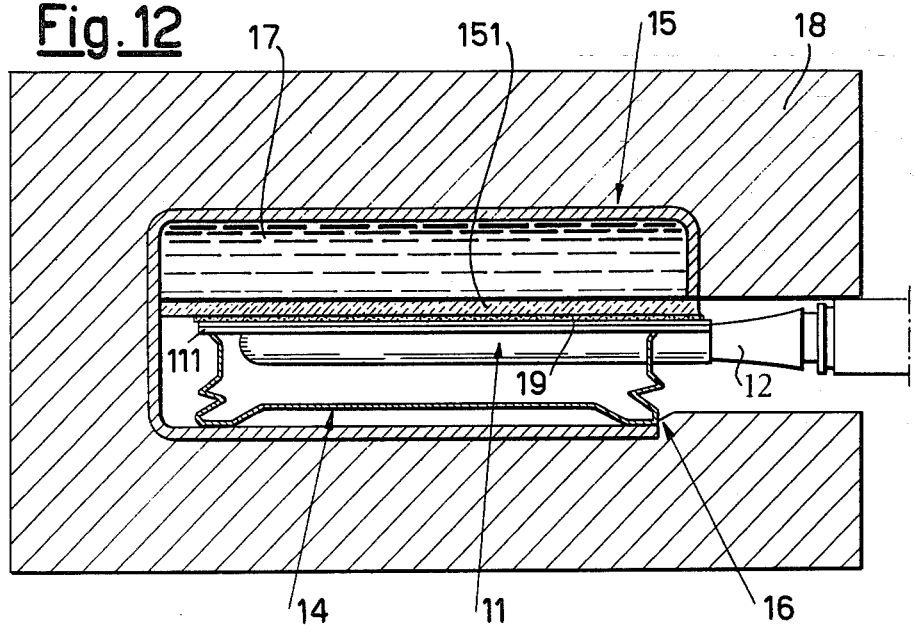
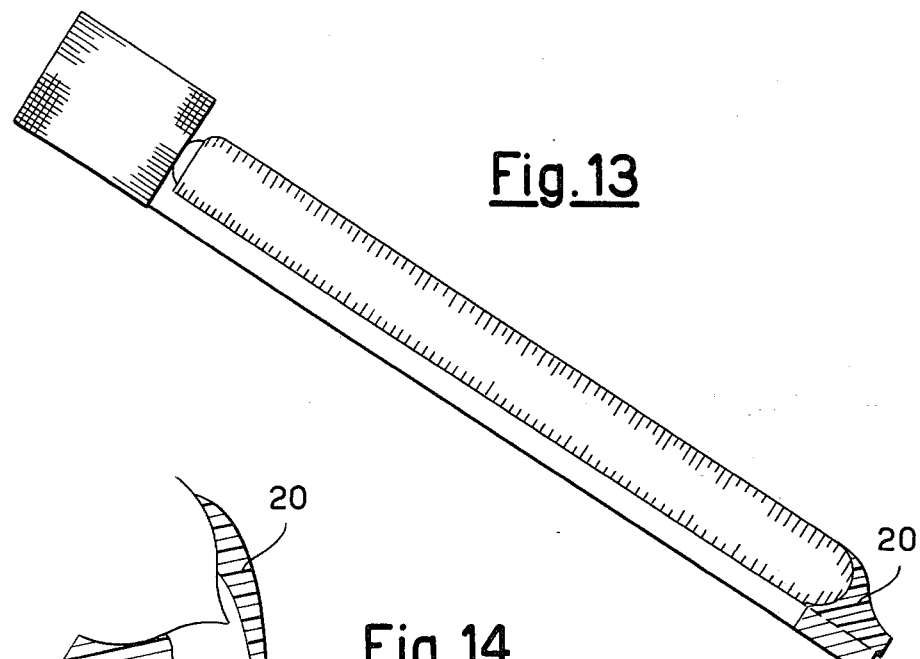
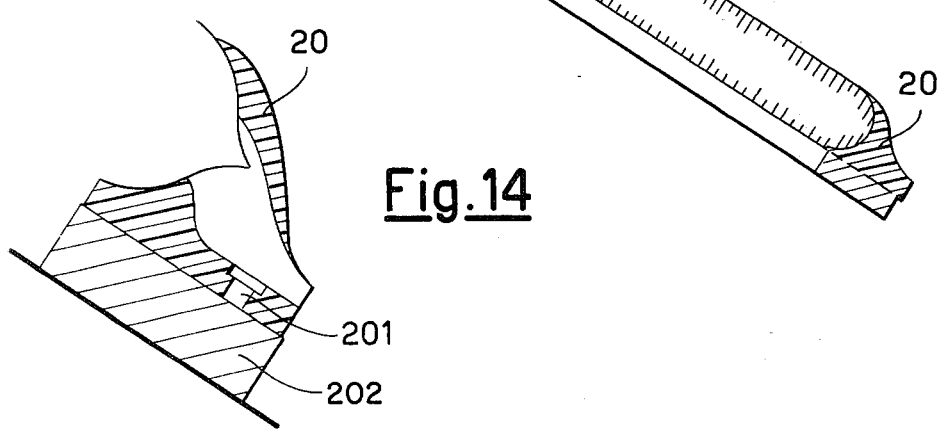

EVACUATED HEATPIPE SOLAR COLLECTOR

This invention relates to an evacuated heatpipe solar collector comprising an absorber which is incorporated in an evacuated glass tube for converting the solar radiation into heat, a condenser connected with the absorber via a piping for transferring the heat, a transfer fluid being provided in the latter piping and which, vaporized in the absorber, is caused to condense in the condenser and transfers to the latter its vaporization heat, the arrangement being such that the above named condenser contains a heat-exchanger through which the working fluid is caused to flow in order to convey the heat to the utilization stations.

The solar collector according to the invention is characterized in that the absorber is equipped with a tube which is transparent in the longitudinal direction and in which an absorbing plate is inserted, the plate being solidly connected with a channel containing the transfer fluid, said channel being closed at one end region and connected at the opposite end region, via a pipe and a sealing sleeve, with a condenser-heat exchanger, the condenser possessing a plurality of channels intended to collect the condensed transfer fluid, such condenser having an extended heat exchange surface and resting against the correspo-nding surface of the heat exchanger in such a way as to have a good heat-transfer contact relationship, a heat-transfer fluid being caused to flow through said exchanger.

Solar collectors are required to convert the predominant fraction of the radiant spectrum of the sunlight into heat and to exchange the heat with the maximum efficiency with a fluid heat-conveying medium such as water. As far as practicable, solar collectors must possess the following properties:

(a) A high absorption (absorption potential $\alpha \geq 0.9$) for the absorber in the entire spectrum span of sunlight ($\lambda = 0.3$ to $2.2$ $\mu m$);

(b) A small effective emission (emission potential $\epsilon \leq 0.3$) for the absorber in the heat radiation field ($\lambda = 3$ to $20$ $\mu m$);

(c) A small heat losses through head conduction and convection;

(d) A small thermal capacity;

(e) A high heat-transfer rating from the absorber to the fluid heat transfer medium.

In this connection, the term selective heat-reflecting layer is intended to connote a layer which is transparent to sunlight (0.3 to 2.2 $\mu m$) and is reflective for radiant heat (3 to 30 $\mu m$) with an emission potential $\epsilon \leq 0.3$ and a reflexion potential for radiant heat $R > 0.7$ ($\epsilon = 1 - R$).

Selective heat-reflecting layers of the kind referred to above can consist of gold, silver, tin dioxide or preferably tin-doped indium oxide.

Selective heat absorbers have, relative to sunlight (0.3 to 2.2 $\mu m$) an absorption potential $\alpha \geq 0.9$ for radiant heat (3 to 30 $\mu m$) an emission potential $\epsilon < 0.15$. Selective absorbers of the kind referred to above can consist of metal oxides such as oxides of nickel, chromium or cobalt, or of metal sulfides such as sulfides of iron, chromium, nickel, cobalt, lead and others, applied to a metallic backing layer.

In addition, a selective absorber can consist of a non-selective absorber coated by a layer of doped indium oxide.

The heat pipe is an apparatus the most important function of which is to convey and distribute heat by vaporization and condensation of a transfer fluid. Its characterizing feature is that the energy which is necessary for the flow of the fluid and the vapor, in the presence of the gravity pull and of the frictional losses is entirely dependent on the heat source and it does not require any pumping systems. The use of heat pipes in solar collectors is known (see for example Published German Patent Application No. 26 46 987.4, or ASE-Bericht der Essener Tagung, February 1977, p.35).

Contrary, however, to the above indicated approaches, it is not necessary to provide any wicks or other capillary-tube type contrivance for pumping the condensed transfer-fluid from the condenser to the vaporizing space, inasmuch as the collector is at a slope with respect to the horizontal plane and the condenser is placed at a level higher than that of the vaporizer, so that in this case the gravity pull as such provides to the feed back into the vaporizing space (absorber of the collector).

The objects and technical problems to be solved to provide a rational evacuated heatpipe solar collector are the following:

(1) No-load run. The term "no-load" is intended to connote the condition under which no energy can be drawn from the collector. The no-load condition can occur whenever:

(a) there are troubles in the system (e.g. a fault of the circulation pump);

(b) The energy absorption of the system is over (e.g. the storage tank is topped up) or there is no utilization of power (e.g. holiday time).

Inasmuch as in the evacuated collectors equipped with selective absorbers no-load condition temperatures up to 250° C. and over can be attained, provisions must be taken for the safety of the entire system. Provision of safety appliances for the case of no-load run raises the installation cost of the system considerably. Provisions must be taken in order that costly safety appliances for the system may be dispensed with by adopting special expedients in the construction of the collector.

(2) Freezing. The solar collectors which are fed with water as the heat-transfer medium suffer from the drawback that they must be protected from freezing in wintertime.

The introduction of antifreeze agents is conducive to additional costs and if a leakage occurs, the damages cannot be forecast: in addition, the poor heat-transfer properties of the water/glycol mixtures are an adverse factor.

Therefore, it is imperative to develop heat-pipe collectors which make possible to provide a system devoid of antifreeze agents.

(3) Absorber. The embodiment of the absorber according to the teaching of DO-26 46 987.4 with glass as a component material is useless since glass is incapable of withstanding the thermal or mechanical loads required for the purpose aimed at and, furthermore, there is the poor heat conductivity of glass to be accounted for, and the difficulty of applying selective layers to glass as well.

The embodiment (according to ASE-Bericht der Essener Tagung, February 1977, page 35) with aluminum would be adapted to the purpose of this invention, but it would be comparatively expensive (extrusion process). Consequently, it is imperative to find a metallic absprber, the manufacture of which is economically acceptable.

(4) Metal and glass union by melting. The union of glass to metal by melting is known, above all, in the electric bulb industry and the appliance therefore must be specially constructed for the particular application contemplated herein, care being taken to ensure mechanical stability and to prevent oscillations of the temperature during construction.

(5) Heat-exchanger. The manufacture of the condenser for a heatpipe collector is one of the most important constructions of component parts. Care must be taken to obtain a good heat transfer from the condenser space. The surface area is to be sized consistently with the size of the collector. Care must be taken, by special provisions, to have a small thermal resistance between the condenser space and the fluid transfer-medium.

(6) Union of component parts. The collector units must be easily assemblable and are subject to the tolerances which are usual in mechanical constructions. The component parts, moreover, must be conveniently replaceable. The evacuated heatpipe solar collector according to this invention fulfils all these requirements.

The construction of a collector according to this invention solves the problem of providing a solar collector having a high efficiency, the construction of which is economically satisfactory, which has easily replaceable component parts and the construction of which is easy.

A preferred exemplary embodiment of the invention will be described in more detail with the aid of the accompanying drawings.

In the drawings:

FIG. 12 is a cross-sectional view of the condenser and its heat-exchanger.

FIG. 13 is a side elevational view of the collector with a shaped piece for the collector, the piece being fastened to a slat.

FIG. 14 is a cross-sectional view of the pieces of FIG. 13.

The solar collector will now be described in more detail with reference to the drawings.

In FIGS. 6, 7, 8 and 9 the different forms of absorber are shown in cross-section. All of them consist of a plate 51 and a channel 10, in which the transfer-fluid is located. The plate 51 consists, for example, of an iron sheet which has been copper coated and has been provided on its upper surface with a selective absorber layer 52. The radiant energy of the sun, which is converted into heat, is transferred through the iron strips 51 into the channel 10. For the heat transfer, the calculation gives the following relationship:

$$\Delta T = (Q/\phi \cdot d) \cdot L^2$$

wherein $Q$ is the unconverted sun energy, $L$ is the distance between the edge of the strip and the channel, $\phi$ is the specific heat conductivity of the metal, $d$ is the thickness of the metal strip and $\Delta T$ is the temperature differential between the edge and the halfway point (channel) of the strip.

Figure 1:
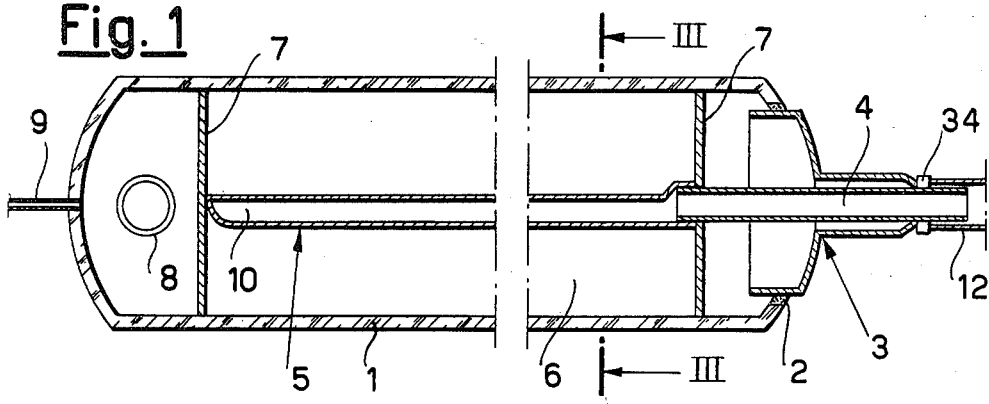
FIG. 1 is a longitudinal cross-sectional view of the absorber.
Figure 2:
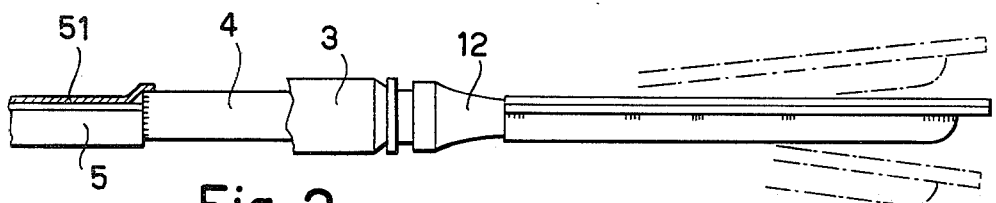
FIG. 2 is a side elevational view of the condenser with the condensor being shown in flexed positions in phantom lines.
Figure 3:
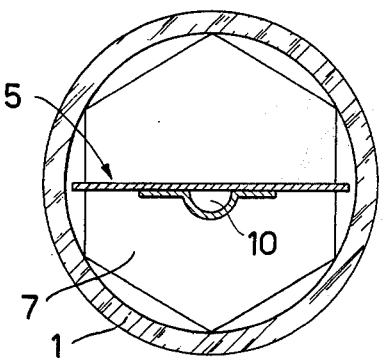
FIG. 3 is a cross-sectional view of the collector, taken along the line III—III of FIG. 1.
Figure 6:
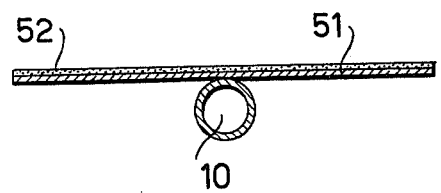
FIGS. 6, 7, 8 and 9 show a cross-sectional view of the absorber plate with different embodiments of the channel.
Figure 7:
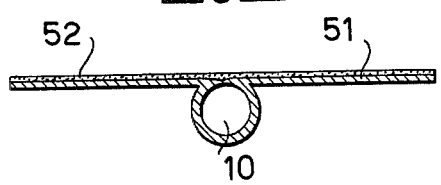
Figure 8:
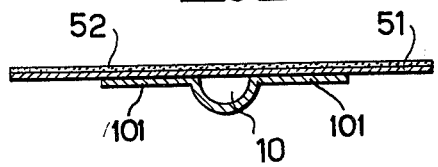
Figure 9:
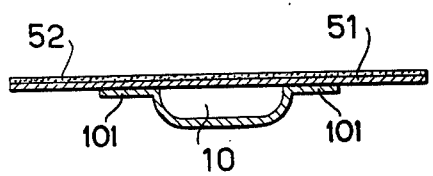
Figure 10:
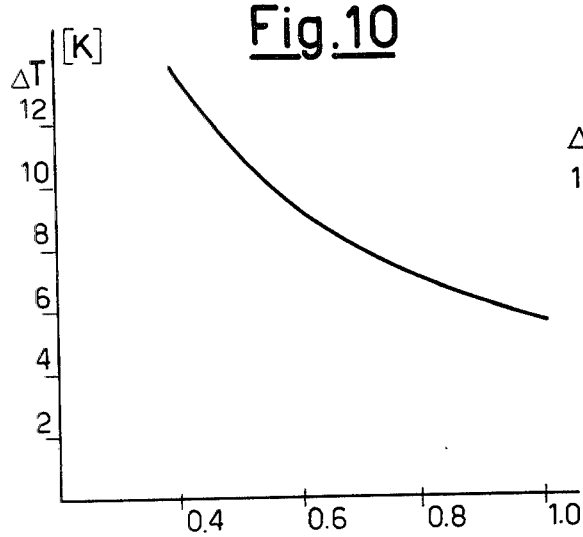
FIGS. 10 and 11 are plots of the calculations made for the embodiments of FIGS. 6 and 8.
Figure 11:
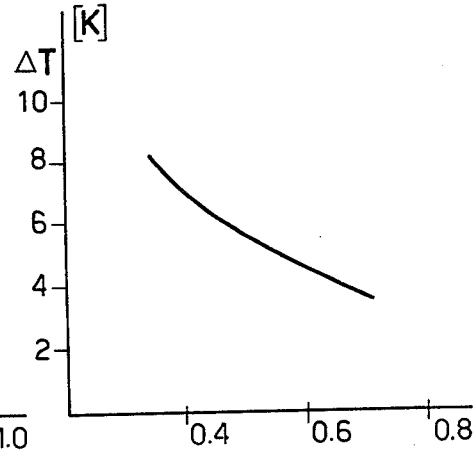

FIG. 10 shows the plot of the $\Delta T$ as a function of the thickness for an embodiment of iron according to FIGS. 6 and 7 (2L=6 cm). For the embodiments of FIGS. 8 and 9 the relationship referred to above must be modified. FIG. 11 shows the plot of the corresponding calculations for the embodiments of FIGS. 8 and 9 (2L=6 cm, 2l=3 cm). The comparison of FIGS. 10 and 11 makes the thermal advantage of the embodiments of FIGS. 8 and 9 conspicuous and it is to be added that the process of manufacture of such profiles is simple. FIG. 1 shows a longitudinal cross-sectional view and FIG. 3 a transversal cross-sectional view of an exemplary embodiment of the collector. In addition the solar collector possesses a transparent covering tube of glass which is sealed at one end. The opposite end is united by melting in place and bonding with a metallic hood 3.

The union by melting of the glass tube 1 with the metallic hood 3 is carried out with an intermediate piece 2 of a special glass, such as flint glass. The metallic hood 3 consists of a material having a coefficient of thermal expension nearly equal to that of the glass (for example ferro-nickel). The shape of the hood 3 has to fulfil two important requirements, viz. (1) mechanical stability and to this purpose the hood must have whenever possible the same size as the pipe 1 in the welding position so as to reduce the local tensions, and (2) the heat path must be as long as practicable so as to minimize heat losses through the piping as much as practicable. The channel of the absorber plate 5 is sealed in a vacuum-tight manner at either end and is connected at the opposite end, still in a vacuum-tight manner, with a metal pipe. The metal pipe 4 must have the worst possible heat conductivity (e.g. iron, bundy metal pipes: as far as possible, the heat transfer should take place from the absorber to the outside through the transfer-fluid).

The absorber 5 is fastened in the shielding pipe 1 with the aid of two planar reflectors 7, which extend to the ends of the cylindric portion of the shielding tube 1 transversally of the tube axis and consist of a reflecting layer of vaporized aluminium or of a thin aluminium sheet bonded thereto. To either end of the absorber, moreover, a gettering pad 8 is fastened.

The pipe 4 and the hood 3 are connected to one another at 34 in a vacuum tight manner. On the front surface of the glass flask there is a pump fitting 9 obtained by hot spinning the glass and through this fitting the interior of the shielding pipe 1 is evacuated up to a residual pressure of less than $10^{-1}$ Torr.

Figure 4:
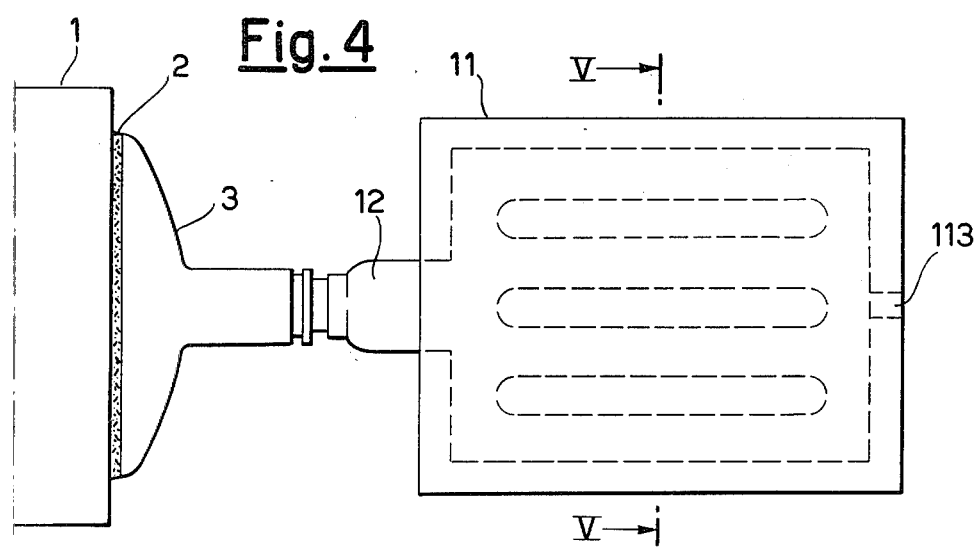
FIG. 4 is a top plan view of the condenser.
Figure 5:
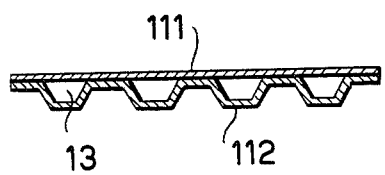
FIG. 5 is a cross-sectional view of the condenser, taken along the line V—V of FIG. 4.

FIGS. 4 and 5 show the condenser and heat exchanger of the collector.

The condenser and heat exchanger 11 is connected to the collector pipe by means of a connecting piece 12 which consists of an early deformable metallic section (for example a copper pipe or a metallic bellows), which permits thermal deflection of the heat exchanger. The heat exchanger 11 consists of a planar piece 111 (FIG. 5) and a deeply rolled profile 112 which are so connected with each other as to provide a plurality of channels 13 (in the example shown there are 4 channels).

The channels of the heat exchanger 13 and the channel of the absorber 10 are connected to one another through intermediate pieces 4 and 12 and are filled with a transfer fluid (to be better detailed hereinafter). The filling ports 113 will then be sealed in a vacuum tight manner. The planar surface of the heat exchanger 11 is coplanar with the absorber plate 5 and is positioned on the same side of the absorber plate as the coating 51 of the plate 5 itself. The planar surface of the condenser 111 provides the exchange interface of the condenser with the heat exchanger of the heat-conveying fluid 15 (FIG. 12).

This arrangement has the outstanding advantage that the transfer-fluid is condensed onto said surface 111 and, under the gravity pull is permitted, as it is being condensed, to flow onto the lower surface 112 and the result is that the surface 111 remains constantly available for condensation.

The surface 111 of thermal heat exchanger of the condenser 11 and the opposing surface of the heat conveying medium 151 are brought into a satisfactory heat exchange relationship with one another by means of a viscous contact material (such as paraffin wax, lubricating oil, grease and so on).

The satisfactory thermal contact is provided by two leaf springs 14, for example, which urge all four corners of the heat exchanger 11 against the surface 151. Both the leaf springs 14 are secured at 16. The easily deformable intermediate piece 12 is so provided that, irrespective of the manufacture tolerances allowed, both the exchange surfaces 111 and 151 are always in good contact with one another. A satisfactory selection of dimensions is experienced for the solar collector whenever the surface of the exchange area of the condenser 111 is as great as about 5% to 8% of the superficial area of the absorber 5.

The heat exchanger 15 for the fluid conveying medium 17 (water) is lined with a thermally insulating foamy material 19 so that the condenser of the collector can easily inserted in the collector.

To the inner end of the collector a shaped piece 20 (for example of a plastics material) is cemented and is fastened to a slat 21 by means of a set screw 201.

A longitudinal expansion which may occur can thus be absorbed either by the heat exchanger 15 or also by the specially provided shell (not shown) therefor.

The glass flasks of the collectors can be separated from each other by a thin strip of plastics material, rubber or silicone rubber applied (cemented) to either side of the pipe.

The safety measures required for the solar energy system for the cases of no-load runs or also for that of a surplus of solar energy lead, as is known, to complications of the systems which make the installation of solar collectors still more expensive. It will be shown hereinafter how a judicious selection of the transfer fluid makes any supplementary safety measures for the system quite unnecessary.

As outlined above, the heat is carried away from the absorber plate by the assistance of a heatpipe.

As is shown, a heatpipe is used well below the critical temperature of the transfer-fluid which is adopted. Above the critical temperature $T_K$ a heatpipe does not operate since the transfer fluid does become no longer condensed so that no heat conveyance can take place at all. But since the condenser of the heatpipe is located externally of the collector and the pipe 12 is endowed but with a poor heat conductivity, the temperature cannot exceed the critical temperature by a great deal there. (The conveyance of heat through a supercritical gas is extremely small). This is also the case when the temperature of the absorber plate within the glass tube rises much above $T_K$. Since, however, the heat conveyance medium of the solar collector system flows around the condenser, the temperature of the system can exceed the $T_K$ only by a small degree. If a transfer fluid is so selected that its $T_K$ roughly corresponds to the higher temperature which is permissible in the system, no problem will arise in the cases of no-load run or surplus of solar energy.

TABLE I tabulates the transfer fluids which are in the question for the production of hot water.

TABLE I

| Transfer fluid | Critical temperature $T_K$ °C. | Critical pressure $P_K$ (bar) |
|---|---|---|
| Freon C 318 | 115 | 27.8 |
| Freon 12 ($CF_2Cl_2$) | 112 | 41.2 |
| Freon 500 ($CF_2Cl_2/CH_3CHF_2$) | 106 | 44.2 |
| Propane ($C_3H_8$) | 96.8 | 43.4 |
| Freon 22 ($CHF_2Cl$) | 96 | 49.8 |
| Freon 502 ($CHF_2Cl/CCl F_2-CF_3$) | 82 | 40.7 |
| Freon 13 Bl ($CBrF_3$) | 67 | 39.6 |

Freon 22 or Freon 12 are especially suitable for the production of hot water.

To place a quantity of a molecular sieve (sodium aluminium silicate) in the heatpipe (for example in the condenser space) is useful in order to absorb the residual gases in the heatpipe, to prevent the possible formation of gas blankets.

I claim:

1. A solar collector comprising an absorber incorporated in an evacuated glass pipe for converting solar radiation into heat, a condenser connected with said absorber via a piping for transferring the heat, a transfer fluid in said piping and which when vaporized in said absorber is caused to condense in said condenser and transfers to said condenser vaporization heat of said transfer fluid, the arrangement being such that said condenser contains a heat-exchanger through which a working fluid is caused to flow to convey heat to utilization stations, said solar collector being characterized in that said absorber includes a tube which is transparent in the longitudinal direction and in which an absorbing plate is positioned, said plate being solidly connected with a channel containing said transfer fluid, said channel being closed at one end region and connected at the opposite region via a pipe and a sealing sleeve with said condenser heat exchanger, the condenser heat exchanger including a plurality of channels for collecting condensed transfer fluid, said condenser heat exchanger having an extended heat exchange surface resting against a corresponding surface of a heat exchanger device in good heat-transfer contact relationship, said working fluid flowing through said heat exchanger device, and spring elements constantly resiliently urging said condenser heat exchanger exchange surface against said corresponding surface of said heat exchange device.

2. Solar collector according to claim 1, characterized in that said sealing sleeve is made of a metal having a thermal expansion coefficient equal to that of the glass of said transparent pipe and has a funnel-like shape with that end of said sealing sleeve having the larger diameter being united by melting with the glass of said transparent pipe through an integral glass welding seam, and wherein the end of said sealing sleeve having the lesser diameter is welded to said pipe in a vacuum-tight manner, and that a connection between said pipe and said condenser is provided by a metal shaped profile which is easily deformable.

3. Solar collector according to claim 1, characterized in that said glass of said transparent tube is formed of an iron-poor soft glass material.

4. Collector according to claim 1 wherein said condenser heat exchanger is generally rectangular and has four corners, and said spring elements are disposed at the four corners.

* * * * *